US012401668B2

(12) United States Patent
Nainar et al.

(10) Patent No.: US 12,401,668 B2
(45) Date of Patent: Aug. 26, 2025

(54) DECENTRALIZED MACHINE LEARNING ACROSS SIMILAR ENVIRONMENTS

(71) Applicant: Cisco Technology, Inc., San Jose, CA (US)

(72) Inventors: Nagendra Kumar Nainar, Morrisville, NC (US); Carlos M. Pignataro, Cary, NC (US); David John Zacks, Vancouver (CA); Dmitry Goloubev, Waterloo (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 982 days.

(21) Appl. No.: 17/479,237

(22) Filed: Sep. 20, 2021

(65) Prior Publication Data
US 2023/0092777 A1    Mar. 23, 2023

(51) Int. Cl.
*G06N 20/00* (2019.01)
*G06N 20/20* (2019.01)
(Continued)

(52) U.S. Cl.
CPC ......... *H04L 63/1425* (2013.01); *G06N 20/00* (2019.01); *G06N 20/20* (2019.01); *H04L 41/16* (2013.01)

(58) Field of Classification Search
None
See application file for complete search history.

(56) References Cited

U.S. PATENT DOCUMENTS 10,419,449 B1 * 9/2019 Agranonik .......... H04L 63/1441
11,483,327 B2 * 10/2022 Hen ...................... H04L 63/104
(Continued)

FOREIGN PATENT DOCUMENTS

WO    2020115273 A1    6/2020
WO    2020192896 A1    10/2020
(Continued)

OTHER PUBLICATIONS

"Federated Learning," Wikipedia, https://en.wikipedia.org/wiki/Federated_learning, retrieved Sep. 16, 2021, 11 pages.
(Continued)

*Primary Examiner* — Xuyang Xia
(74) *Attorney, Agent, or Firm* — Edell, Shapiro & Finnan, LLC

(57) ABSTRACT

A method, computer system, and computer program product are provided for decentralized machine learning. A plurality of computing networks are identified by determining that each computing network of the plurality of computing networks satisfies a predetermined number of criteria. A decentralized learning agent is provided to each computing network, wherein the decentralized learning agent is provided with input parameters for training and is trained using training data associated with a computing network to which the decentralized learning agent is provided. A plurality of learned parameters are obtained from the plurality of computing networks, wherein each learned parameter of the plurality of learned parameters is obtained by training the decentralized learning agent provided to each respective computing network. A global model is generated based on the plurality of learned parameters.

20 Claims, 10 Drawing Sheets

(51) Int. Cl.
*H04L 9/40* (2022.01)
*H04L 41/16* (2022.01)

(56) References Cited

U.S. PATENT DOCUMENTS

| | | | |
|---|---|---|---|
| 2019/0166144 A1* | 5/2019 | Mirsky | G06N 20/20 |
| 2021/0037050 A1* | 2/2021 | Ree | H04L 63/1416 |
| 2021/0174257 A1 | 6/2021 | Pothula et al. | |
| 2021/0374617 A1* | 12/2021 | Chu | G06N 20/20 |
| 2021/0383280 A1* | 12/2021 | Shaloudegi | G06F 17/18 |
| 2021/0406782 A1* | 12/2021 | Nakayama | G06F 16/27 |

FOREIGN PATENT DOCUMENTS

| | | | |
|---|---|---|---|
| WO | 2020248538 A1 | 12/2020 | |
| WO | 2021089429 A2 | 5/2021 | |
| WO | WO-2022045937 A1 * | 3/2022 | G06N 20/00 |

OTHER PUBLICATIONS

Brendan McMahan, et al., "Federated Learning: Collaborative Machine Learning without Centralized Training Data," Google AI Blog, https://ai.googleblog.com/2017/04/federated-learning-collaborative.html, Apr. 6, 2017, 5 pages.

Ece Işik Polat, "Implementation of FedAvg (Federated Averaging) with PyTorch," Towards Data Science, https://towardsdatascience.com/federated-learning-a-simple-implementation-of-fedavg-federated-averaging-with-pytorch-90187c9c9577, Sep. 24, 2020, 17 pages.

* cited by examiner

DECENTRALIZED MACHINE LEARNING ACROSS SIMILAR ENVIRONMENTS

TECHNICAL FIELD

The present disclosure relates to decentralized machine learning, and more specifically, to performing decentralized machine learning across computing environments having similar infrastructures.

BACKGROUND

As the fields of machine learning and artificial intelligence (AI) rapidly gain momentum, researchers have observed that one of the more difficult aspects of studying and developing machine learning models is obtaining sufficient volumes of suitable training data. The accuracy of a trained model can be directly influenced by the volume of data available for training the model. Some decentralized machine learning approaches, such as federated learning, seek to solve this problem by distributing the training process across various computing devices, which perform training operations using local data and share the results, rather than the underlying data, thereby addressing potential data privacy concerns. However, because conventional approaches to decentralized machine learning combine all of the local training results by averaging the individual outputs, the resulting trained models that are produced tend to be rather generic and thus not particularly accurate for any specific use-case.

DESCRIPTION OF EXAMPLE EMBODIMENTS

Overview

Figure 1:
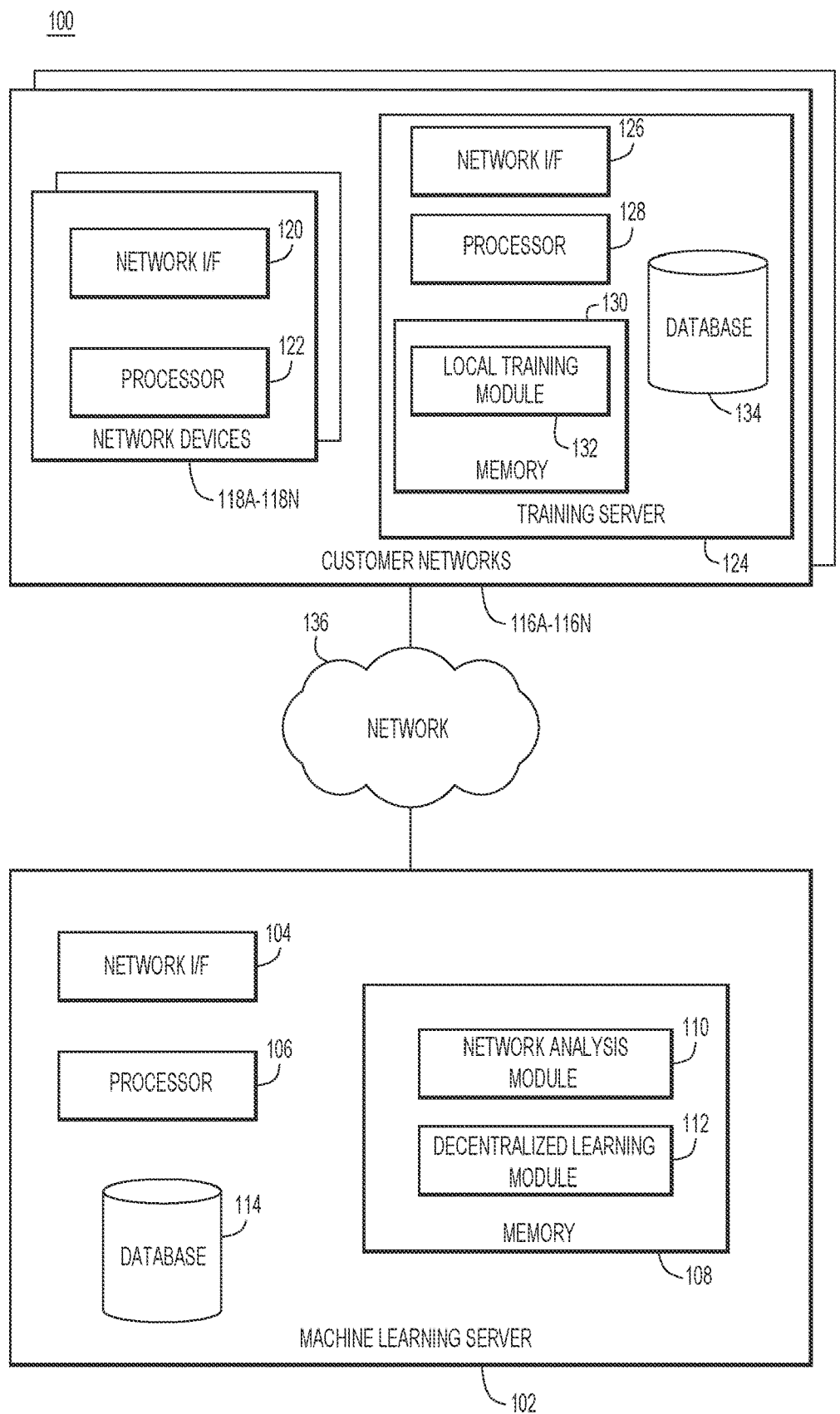
FIG. 1 is a block diagram depicting an environment for training a decentralized machine learning model, in accordance with an example embodiment.

According to one embodiment, techniques are provided for decentralized machine learning. A plurality of computing networks are identified by determining that each computing network of the plurality of computing networks satisfies a predetermined number of criteria. A decentralized learning agent is provided to each computing network, wherein the decentralized learning agent is provided with input parameters for training and is trained using training data associated with the computing network to which the decentralized learning agent is provided. A plurality of learned parameters are obtained from the plurality of computing networks, wherein each learned parameter of the plurality of learned parameters is obtained by training the decentralized learning agent provided to each respective computing network. A global model is generated based on the plurality of learned parameters. The computing networks may be communication networks that include networking devices, such as switches, routers, gateways, firewalls, etc., as well as various computing and data storage equipment.

Example Embodiments

Embodiments are provided for decentralized machine learning, and more specifically, to performing decentralized machine learning across tenants having similar computing/networking environments.

Decentralized machine learning refers to a form of machine learning in which algorithms are distributed to multiple decentralized computing nodes, each of which performs training using a local set of training data. Once the training nodes complete their local training, the results can be combined at a central server to generate a global model that captures the learned patterns derived by the local training of the decentralized computing nodes. One common form of decentralized machine learning is federated learning, in which an algorithm is trained across multiple decentralized edge devices or servers holding local data samples, without performing any exchange of the local data samples.

One of the more difficult aspects of developing machine learning models is obtaining robust sets of training data. Decentralized learning approaches aim to address this issue, as training can be accomplished without requiring the individual training nodes to share their local sets of training data with the other training nodes or with any other entities. Thus, sensitive data, such as electronic health records, can be safely used to contribute toward the training of a global model without compromising the privacy of the data. Therefore, the confidential or sensitive data of various participating individuals or organizations can be used to develop a decentralized learning model that can provide beneficial results without exposing any of the participants' data.

Conventional approaches to decentralized machine learning generally attempt to gather as much training data as possible, and therefore are not particularly selective about the training nodes that are selected to participate in the training of a model (as long as the local training data is suitable). In contrast, the embodiments described herein employ techniques that select particular computing networks whose data will be included in a decentralized machine learning task. Specifically, computing networks having similar infrastructures are selected, thereby ensuring that the resulting global model is highly accurate when applied to those networks or similar networks. Thus, decentralized machine learning models can be developed for specific types of networks in a manner that increases the performance of the models. Accordingly, present embodiments provide the practical application of improving the accuracy of machine learning models for tasks such as anomaly detection, network validation, security monitoring, and any other desired applications in which machine learning models may be used. In particular, by performing decentralized training using data obtained from similar networks, more relevant output parameters may be selected, thereby increasing the accuracy of any machine learning model, such as a predictive model or a classifier model, that is based upon the output parameters.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

Embodiments are now described in detail with reference to the figures. FIG. 1 is a block diagram depicting an environment 100 for performing decentralized machine learning, in accordance with an example embodiment. As depicted, environment 100 includes a machine learning server 102, a plurality of customer networks 116A-116N, and a (communication) network 136. Each customer network 116A-116N includes networking devices 118A-118N that constitute the network's infrastructure, and a training server 124. It is to be understood that the functional division among components of environment 100 have been chosen for purposes of explaining various embodiments and is not to be construed as a limiting example. Each customer network 116A-116N may include additional computing and data storage equipment as well, though not shown in FIG. 1, for simplicity.

Machine learning server 102 includes a network interface (I/F) 104, at least one processor 106, memory 108, and database 114. Memory 108 stores software instructions for a network analysis module 110 and a decentralized learning module 112. Machine learning server 102 may include a rack-mounted server, or any other programmable electronic device capable of executing computer readable program instructions. Network interface 104, such as one or more network interface cards, line cards, etc., that enable components of machine learning server 102 to send and receive data over a network, such as network 136. In general, machine learning server 102 oversees decentralized learning tasks and analyzes computing networks, such as customer networks 116A-116N to select networks that are suitable for particular decentralized learning tasks. Machine learning server 102 may include internal and external hardware components, as depicted and described in further detail with respect to FIG. 9.

Network analysis module 110 and decentralized learning module 112 may include one or more modules or units to perform various functions of the embodiments described below. Network analysis module 110 and decentralized learning module 112 may be implemented by any combination of any quantity of software and/or hardware modules or units, and may reside within memory 108 of machine learning server 102 for execution by a processor, such as processor 106.

Network analysis module 110 analyzes data relating to the infrastructures of customer networks 116A-116N to identify particular customer networks that are similar to each other. In some embodiments, network analysis module 110 computes a similarity score for each customer network 116A-116N and compares the similarity scores to a threshold value to select networks for decentralized learning tasks. The data analyzed by network analysis module 110 may include a specification that details the particular infrastructure of a network, including the specific hardware components, software components, networking components, and any other components, settings or configuration details, etc. The similarity score can be computed based on (optionally weighted) counts of a number of commonalities, such as same enabled features in a network, same hardware employed in the network, same software employed in the network (and versions thereof), same firmware employed in the network (and versions thereof), same or similar geographical location(s) of network equipment, and the like. Additionally or alternatively, the similarity score may be based on criteria such as network connectivity, number of network devices, number of network devices per role, network resources such as bandwidth, latency, etc., communication protocols or standards employed by a network, use of particular third-party infrastructure or services, network security features, and the like.

In some embodiments, the similarity score determined by network analysis module 110 is a raw score based on the counts of particular features. Each feature present in a network may thus satisfy a criterion of the similarity score, and a predetermined value for that feature may be awarded for that network's similarity score. Each feature may be weighted so that the presence or absence of some features have a greater influence over the similarity score. In some embodiments, the similarity score is a value such as an integer. In some embodiments, the similarity score is represented as a percentage; for example, a score of 100% may indicate that all of the desired features are present in a particular network, whereas a score of 0% would indicate that none of the features are present. Once similarity scores are computed for each network being considered, network analysis module 110 may compare the similarity scores to a threshold value, and select the networks whose scores satisfy the threshold value for participation in a decentralized learning task.

Customer networks 116A-116N each include a plurality of network devices 118A-118N and a training server 124, which may be a particular network device that is selected for executing operations relating to the local training of a decentralized machine learning model. Each network device 118A-118N includes a network interface (I/F) 120, and at least one processor 122. The network devices 118A-118N may further include network processing hardware (e.g., one or more Application Specific Integrated Circuits). Each network device 118A-118N may be a server, a router, a hub, a switch, a bridge, a gateway, a modem, a repeater, an access point, a firewall, storage device, computing device, an endpoint device (e.g., a laptop computer, a tablet computer, a netbook computer, a personal computer (PC), a desktop computer, a personal digital assistant (PDA), or a smart phone) or any other programmable electronic device capable of executing computer readable program instructions and performing networking-related operations in customer networks 116A-116N. Network interface 120 enables each network device 118A-118N to send and receive data over a network, such as network 136, as well as within the customer networks 116A-116N. In general, network devices 118A-118N may perform any networking or computing task, including transmitting, receiving, and/or processing of data obtained from, or provided to, network-accessible computing devices, including devices internal and/or external to customer networks 116A-116N. Each network device 118A-118N may include internal and external hardware components, as depicted and described in further detail with respect to FIG. 9. Moreover, the network devices 118A-118N may be virtual in the sense that they are embodied as software running on a computing device.

Training server 124 includes a network interface (I/F) 126, at least one processor 128, memory 130, and a database 134. Memory 130 stores software instructions for a local training module 132. Training server 124 may include a rack-mounted server, or any other programmable electronic device capable of executing computer readable program instructions. Network interface 126 enables components of training server 124 to send and receive data over a network, such as network 136. In general, training server 124 is a computing device that performs the local training operations of a decentralized learning task. Training server 124 may include internal and external hardware components, as depicted and described in further detail with respect to FIG. 9. In some embodiments, training server 124 is a device of network devices 118A-118N that is selected for performing local training due to its availability, its computing resources, or because of convenience.

Decentralized learning module 112 may perform various functions associated with decentralized learning tasks, such as generating and distributing initial training algorithms to training server 124 of each customer network 116A-116N for training, combining results of the training process to generate trained global models, and other tasks, such as providing trained global models to network-accessible destinations and/or executing trained global models to respond to processing requests.

In some embodiments, decentralized learning module 112 initiates a decentralized learning task by providing copies of an algorithm that represents the pre-trained state of a decentralized learning model to training server 124 of each customer network 116A-116N that is selected for participating in a decentralized learning task. Decentralized learning module 112 may select initial values or settings for the pre-trained algorithm, such as providing random or other starting values to initialize the algorithm. In some embodiments, the training server 124 of each selected customer network 116A-116N receives an identical copy of the pre-trained algorithm, whereas in other embodiments, some variations may exist between the pre-trained algorithms that are distributed for a given federated learning task. In particular, the input parameters can be the same for each distributed learning model (e.g., a homogeneous decentralized learning approach), or the input parameters may be different for each distributed learning model (e.g., a heterogeneous decentralized learning approach). Input parameters can vary for the particular type of decentralized learning model that is distributed, and may include, for example, indications of various aspects of a network's data that should be processed by the model, such as telemetry data or other data obtained from, or generated by, devices (e.g., network devices 118A-118N) or categories of devices.

The type of machine learning model that is implemented by the distributed, pre-trained algorithms may vary depending on the particular decentralized learning task, and may include any form of machine learning that is suitable for training via any conventional or other decentralized learning approaches, such as federated learning. For example, decentralized learning algorithms may utilize neural network-based machine learning techniques. Once local training is complete, each training server 124 may provide results back to machine learning server 102. Decentralized learning module 112 may combine the results from multiple customer networks 116A-116N to generate a global trained model, which can be generated using any conventional or other decentralized learning techniques. In general, a global model may be generated based on output parameters of the trained distributed models, including the weights and biases of each trained distributed model's neural network; values for the global model can be obtained by averaging or otherwise combining corresponding values of multiple trained distributed models. In some embodiments, the various outputs are combined using an aggregating technique such as Federated Averaging (FedAvg) or Federated Stochastic Gradient Descent (FedSGD). The global trained model can be used for a variety of applications, such as performing anomaly detection in the network by forecasting future network behavior, and then comparing the forecasted data to subsequently-observed data of the computing network.

Database 114 may include any non-volatile storage media known in the art. For example, database 114 can be implemented with a tape library, optical library, one or more independent hard disk drives, or multiple hard disk drives in a redundant array of independent disks (RAID). Similarly, data in database 114 may conform to any suitable storage architecture known in the art, such as a file, a relational database, an object-oriented database, and/or one or more tables. Database 114 may store data relating to customer networks 116A-116N, such as a specification describing the infrastructure of each network. Additionally or alternatively, database 114 may store data relating to pre-trained decentralized learning models, trained global models, and the like.

Local training module 132 may include one or more modules or units to perform various functions of the embodiments described below. Local training module 132 may be implemented by any combination of any quantity of software and/or hardware modules or units, and may reside within memory 130 of training server 124 for execution by a processor, such as processor 128.

Local training module 132 may receive a pre-trained algorithm, referred to as a decentralized learning agent, that can perform a decentralized learning task. Using the decentralized learning agent, local training module 132 can develop a trained model using a set of training data that is local to training server 124 and/or the particular customer network of training server 124. Thus, each training server 124 performs training using data that can be retained within its respective customer network, ensuring privacy of the data. Local training module 132 may receive pre-trained algorithms from a central source, such as decentralized learning module 112 of machine learning server 102. Local training module 132 may also receive training input parameters, such as a particular number of epochs to perform training, criteria for determining that a local training task is completed, particular types of data to use as input for the model, and the like. In some embodiments, the input parameters specify certain data to include or exclude when training the model, such as telemetry data obtained from a certain category of network devices 118A—118N, or other data generated by a customer network and/or its constituent network devices 118A-118N, including data generated as a result of analyzing other data. In some embodiments, the input parameters may specify to perform training using telemetry data from particular network devices 118A-118N, statistical data describing the performance of customer networks 116A-116N, such as throughput data, latency data, etc., and/or any other data relating to a customer network of customer networks 116A-116N.

Local training module 132 may share as output the results of training. The output may include the weight values and/or bias values of a neural network. In some embodiments, the output of local training module 132 includes features that are selected as particularly relevant to identifying an event in a network. For example, as a result of training, it may be determined that data obtained from a particular type of hub, fulfilling a particular type of role is particularly relevant to predicting a network outage. Local training module 132 may share the output with machine learning server 102 so that a global model may be developed. In some embodiments, local training module 132 does not begin training until instructed by machine learning server 102, which may not transmit the instruction to a particular training server 124 to begin training until network analysis module 110 can determine that the customer network of training server 124 will be included in the decentralized learning task.

Database 134 may include any non-volatile storage media known in the art. For example, database 134 can be implemented with a tape library, optical library, one or more independent hard disk drives, or multiple hard disk drives in a redundant array of independent disks (RAID). Similarly, data in database 134 may conform to any suitable storage architecture known in the art, such as a file, a relational database, an object-oriented database, and/or one or more tables. Database 134 may store data relating to pre-trained models, locally-trained models (including outputs), and training data, including any data generated by, or descriptive of, the particular customer network of training server 124.

Network 136 may include a local area network (LAN), a wide area network (WAN) such as the Internet, or a combination of the two, and includes wired, wireless, or fiber optic connections. In general, network 136 can be any combination of connections and protocols known in the art that will support communications between customer networks 116A-116N and/or machine learning server 102 via their respective network interfaces in accordance with the described embodiments.

Figure 2:
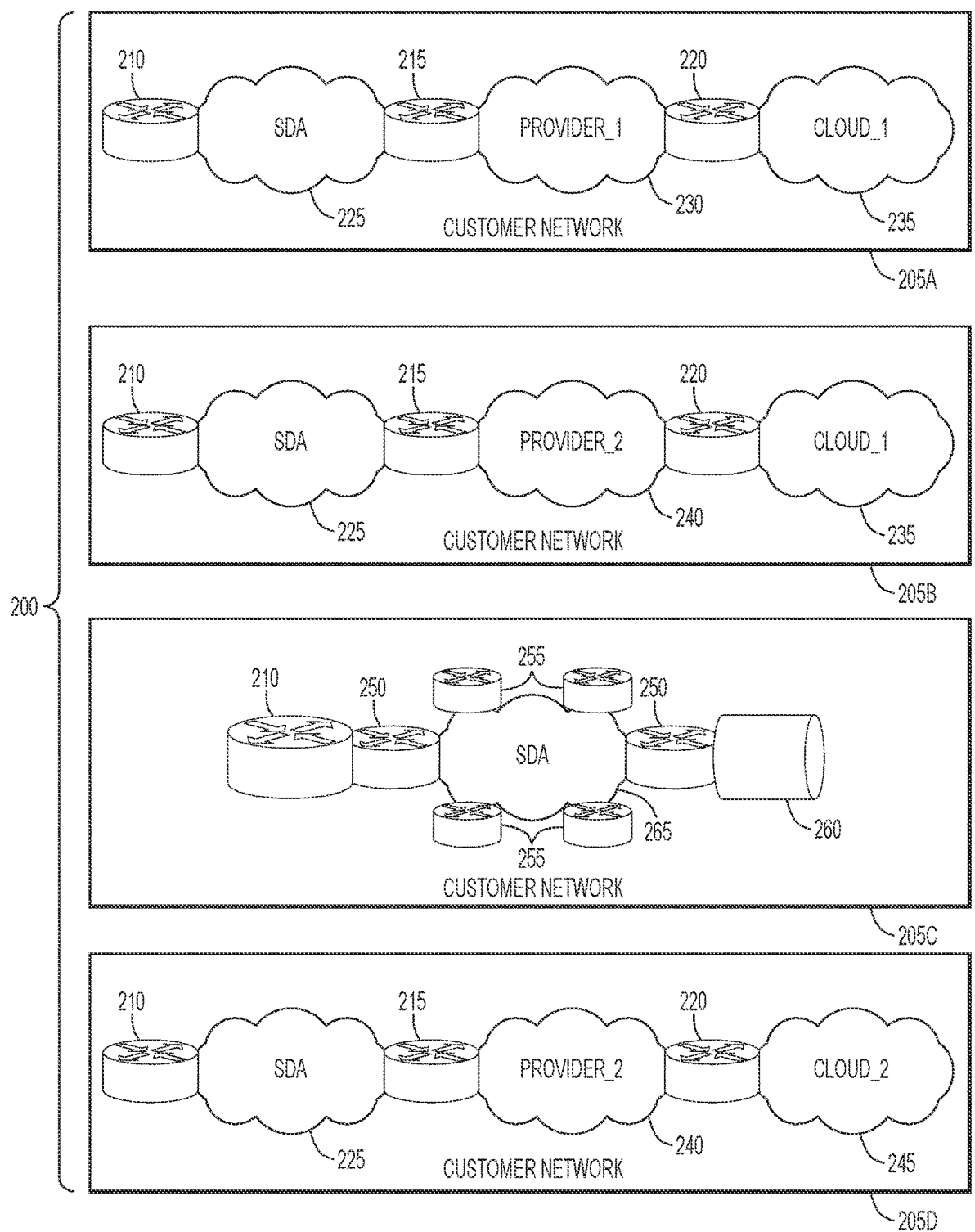
FIG. 2 is a block diagram depicting a group of different computing networks, in accordance with an example embodiment.

Referring to FIG. 2, a block diagram is shown depicting a group 200 of different computing networks, in accordance with an example embodiment. As depicted, the computing networks include customer network 205A-205D, including their infrastructure components.

For the purposes of example and discussion, each customer network 205A-205D has a different infrastructure. Customer network 205A employs infrastructure that includes switches 210, 215, and 220, a software-defined architecture (SDA) 225, a first provider component ("PROVIDER_1") 230, and a first cloud component ("CLOUD 1") 235. Customer network 205B includes switches 210, 215, and 220, SDA 225, a second provider component ("PROVIDER 2") 240, and a first cloud component 235. Customer network 205C includes switch 210, switches 250, switches 255, an SDA 265, and a database 260. Customer network 205D includes switches 210, 215, and 220, an SDA 225, a second provider component 240, and a second cloud component ("CLOUD 2") 245.

Thus, each customer network 205A-205D has a different architecture. A similarity score may be computed for each customer network 205A-205D to determine which, if any to include in a decentralized learning task. As an example, a similarity score that includes switches 210, 215, and 220, among other components, as criteria, may be calculated for each customer network 205A-205D: customer network 205A may have a similarity score of 95%, customer network 205B may have a similarity score of 91%, customer network 205C may have a similarity score of 35%, and customer network 205D may have a similarity score of 98%. Thus, if a predetermined threshold value of 90% is required for inclusion in a decentralized learning task, then customer networks 205A, 205B, and 205D will all be selected, as their similarity scores all surpass the threshold value of 90%. Accordingly, present embodiments may identify a subset of networks which are similar enough to each other to support a common decentralized learning task.

Figure 3A:
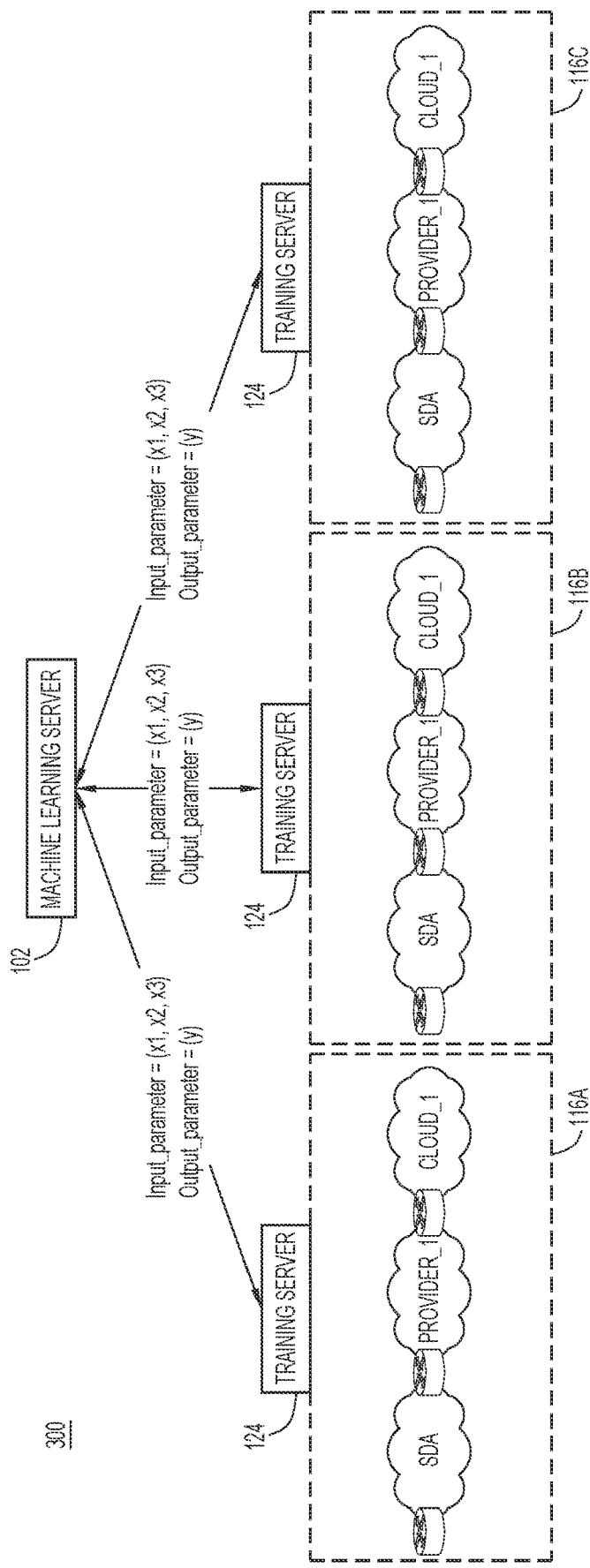
FIG. 3A is a block diagram depicting homogeneous training of a decentralized model, in accordance with an example embodiment.

Referring to FIG. 3A, a block diagram is shown depicting homogeneous training of a decentralized model 300, in accordance with an example embodiment. As depicted, three customer networks 116A, 116B, and 116C have been selected for participating in a decentralized learning task by machine learning server 102. In embodiments in which homogeneous training is performed, each customer network (e.g., customer networks 116A, 116B, and 116C) is provided with the same input parameters (e.g., "x1," "x2," and "x3"). Thus, in homogeneous training embodiments, the decentralized learning agent for each customer network receives identical input parameters. These input parameters are then used by the training servers 124 of each customer network to perform local training and to derive one or more output parameters. Thus, each training server 124 is instructed to use the same algorithm to train a model. The output parameters can be provided to machine learning server 102 and averaged to generate a global model.

Figure 3B:
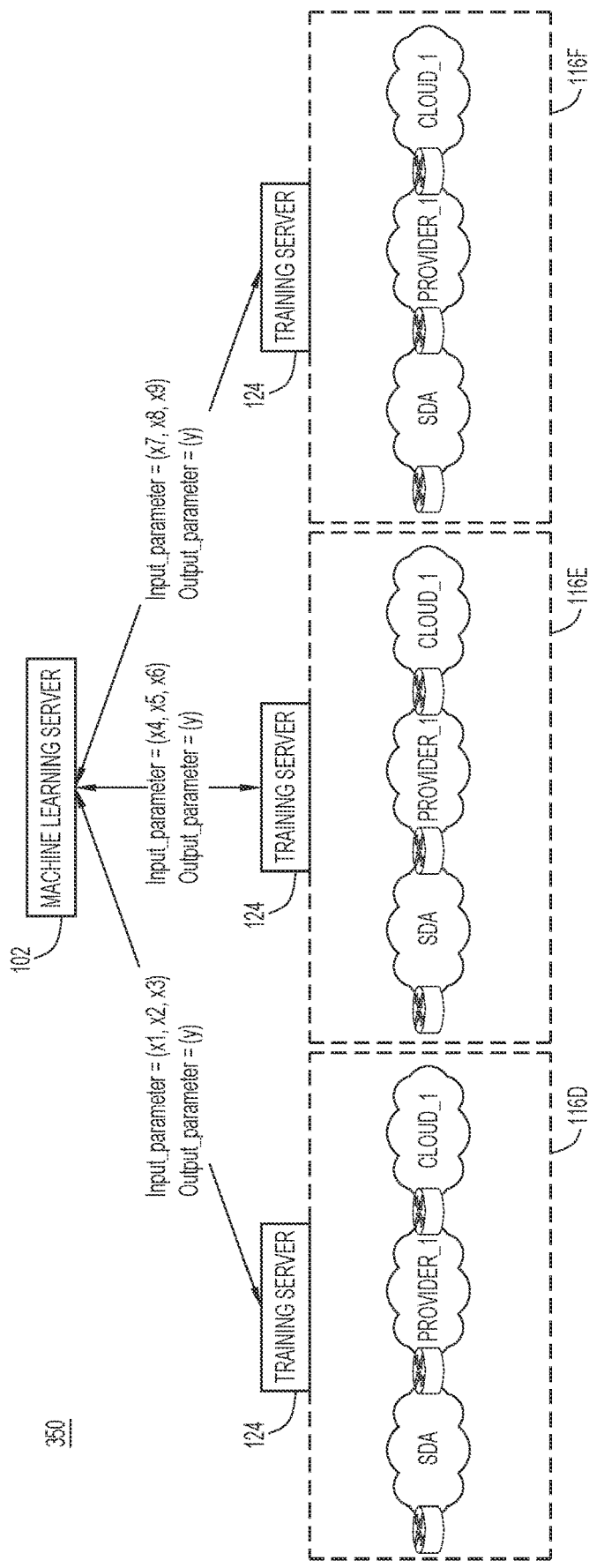
FIG. 3B is a block diagram depicting heterogeneous training of a decentralized model, in accordance with an example embodiment.

Referring to FIG. 3B, a block diagram is shown depicting heterogeneous training of a decentralized model 350, in accordance with an example embodiment. In contrast with the embodiment depicted in FIG. 3A, the embodiment of FIG. 3B shows a model being trained using a heterogeneous approach, meaning that different input parameters for the decentralized models are provided to each training server 124. Some or all of the decentralized learning agents of each customer network may receive different input parameters; in some embodiments, at least two decentralized agents receive different input parameters (e.g., in some embodiments, some of the decentralized learning agents may receive the same input parameters, but these embodiments are still considered to perform heterogeneous training as long as at least two decentralized learning agents are provided with different parameters). Thus, each training server 124 will use a different algorithm to perform local training. For example, the training server 124 of customer network 116D uses input parameters "x1," "x2," and "x3," whereas the training server 124 of customer network 116E is provided with input parameters "x4," "x5," and "x6," and the training server 124 of customer network 116F is provided with input parameters "x7," "x8," and "x9." The output parameters may then be provided to machine learning server 102, which can be used with conventional or other approaches to combine models that have different architectures from each other and/or different architectures from the resulting global model.

Figure 4:
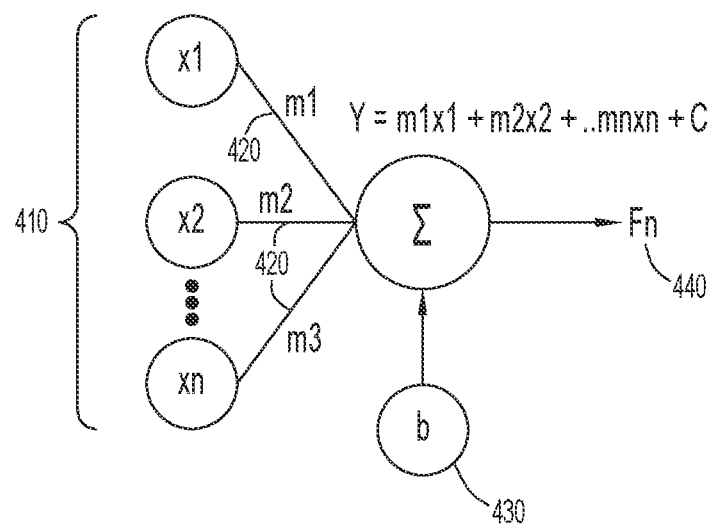
FIG. 4 is a block diagram depicting a local model being generated via homogeneous training of a decentralized model, in accordance with an example embodiment.

Referring now to FIG. 4, a block diagram is shown depicting a local model 400 being generated via homogeneous training of a decentralized model, in accordance with an example embodiment. In particular, inputs parameters 410 (e.g., x1, x2, . . . , xn) are provided to the model, and initial values for weights 420 (e.g., m1, m2, . . . mn) are provided for each input parameter 410. Additionally, a bias term 430 can be provided for embodiments in which the machine learning model that is employed is a neural network. After training is completed, the learned values of the weights can be applied to the input parameters to yield an output parameter (Fn) at 440. In some embodiments, the output parameter is a sum of weighted inputs (e.g., "Y" is equal to "x1" multiplied by "m1" plus "x2" multiplied by "m2", etc.). The output parameters for each locally-trained model can be combined via conventional or other decentralized machine learning techniques to generate a global model. In particular, a FedAvg or FedSGD approach may be used to combine individual training results. In some embodiments, the corresponding weight values for each locally-trained model are averaged to generate a global model; for example, the "m1" values from each local model are averaged to obtain a global "m1" value, and the like.

Figure 5:
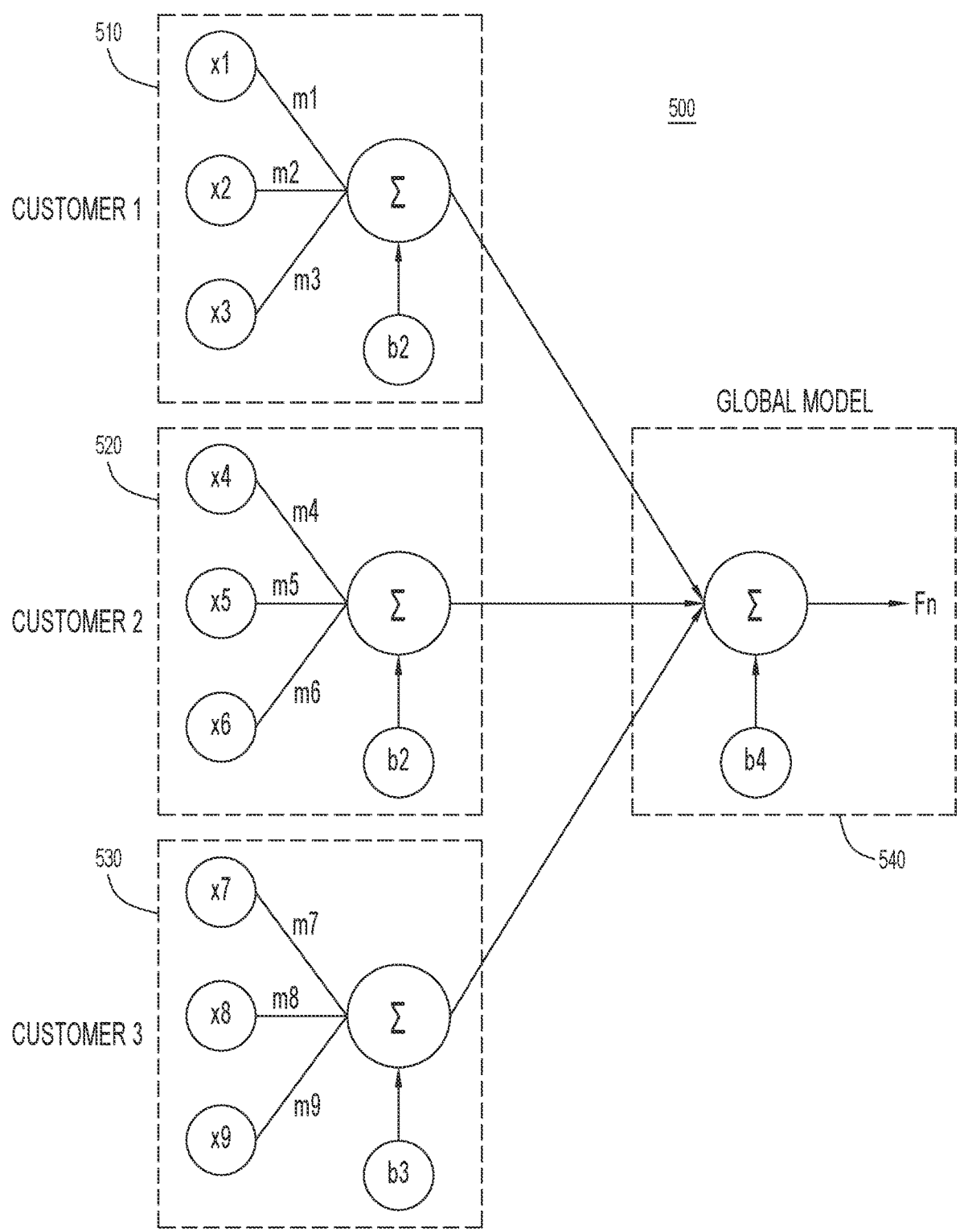
FIG. 5 is a block diagram depicting a global model generated based on results of heterogeneous training of a decentralized model, in accordance with an example embodiment.

Referring to FIG. 5, FIG. 5 is a block diagram depicting a global model 500 generated based on results of heterogeneous training of a decentralized model, in accordance with an example embodiment. As depicted, customer networks 510, 520, and 530 perform local training. The local training may be substantially similar to the local training of homogeneous training embodiments, such as the training embodiment that is depicted and described in further detail with respect to FIG. 4. However, in contrast to homogeneous training, each customer network is provided with different input parameters in heterogeneous training approaches. In the depicted example, customer network 510 is provided with inputs "x1," "x2," and "x3," customer network 520 is provided with inputs "x4," "x5," and "x6," and customer network 520 is provided with inputs "x7," "x8," and "x9."

Since heterogeneously-trained local models have different parameters, a global model cannot be generated by averaging weights, as the weights apply to different parameters. Rather, machine learning techniques such as knowledge distillation and/or transfer learning may be employed to generate a global model 540 based on the outputs of the locally-trained models. In some embodiments, a most relevant parameter, or group of parameters, is selected from each locally-trained model for inclusion in global model 540. For example, a model trained using data of customer network 510 may determine that parameter x3 is particularly useful for performing a classification or prediction; likewise, it may be determined that parameter x4 is the most influential parameter from customer network 520, and parameter x9 is the most influential parameter from customer network 530; accordingly, a resulting global model may include parameters x3, x5, and x9.

Figure 6:
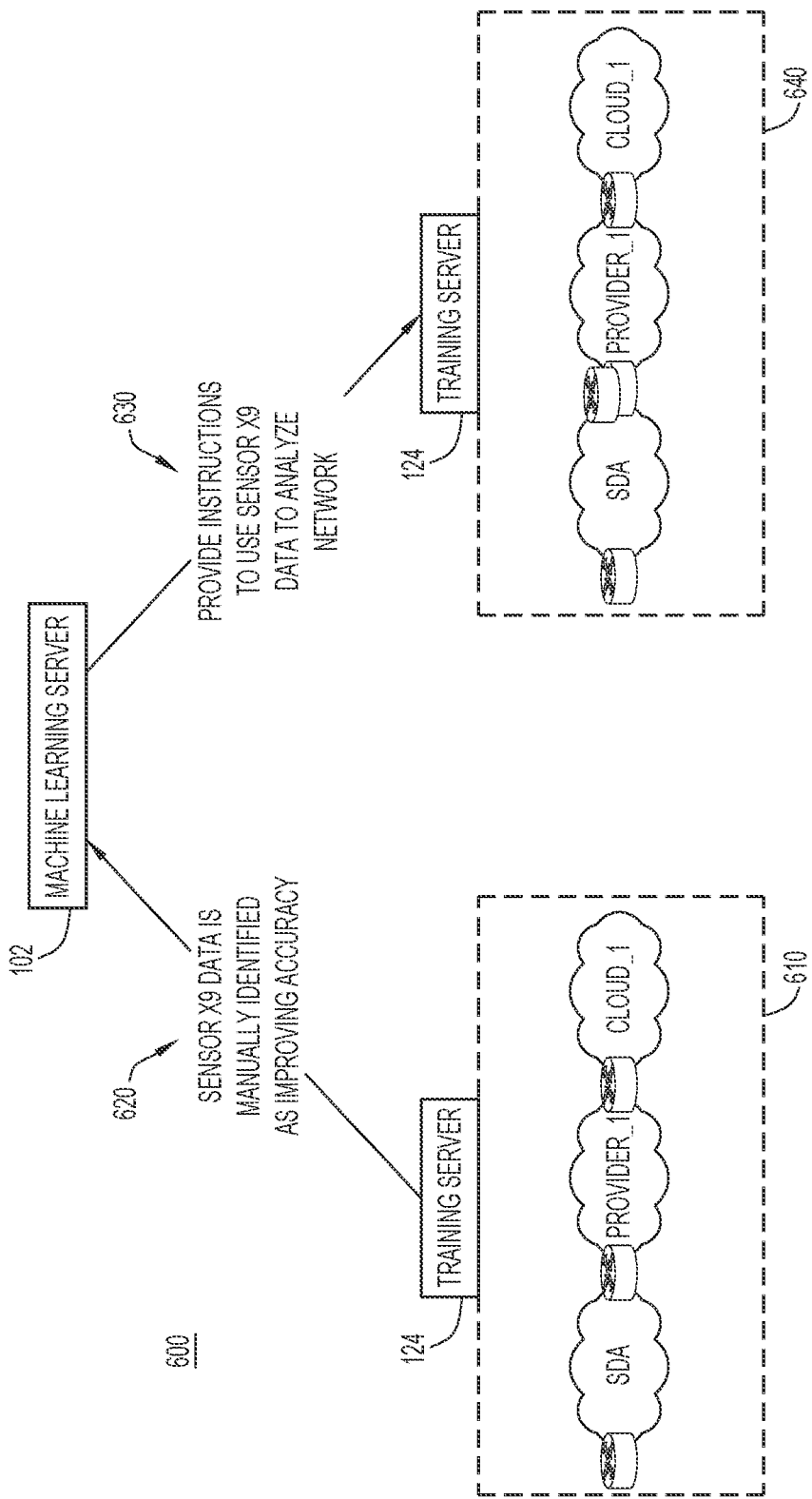
FIG. 6 is a block diagram depicting semi-supervised training of a decentralized model, in accordance with an example embodiment.

Referring to FIG. 6, a block diagram is shown depicting semi-supervised training of a decentralized model 600, in accordance with an example embodiment. As depicted, a parameter of customer network 610 can be defined at operation 620 as particularly relevant and shared or otherwise applied, at operation 630, to similar customer network 640. In particular, an administrator or other users of customer network 610 may have knowledge that data relating to "sensor x9" is particularly relevant for identifying or predicting a network event in customer network 610. Thus, sensor x9's data can be manually included, as shown in operation 620, in a trained global model by identifying the data to machine learning server 102, regardless of whether the local training had selected sensor x9's data to be included in an output parameter. When machine learning server 102 applies the global model to another customer network, such as customer network 640, that is similar to customer network 610 (e.g., as determined according to their respective similarity scores), then machine learning server 102 may include instructions with any global model that is applied to customer network 640 to include sensor x9 data in network analysis tasks (operation 630). Accordingly, influential aspects of a network can be shared with other networks to improve the accuracy of any global models.

Figure 7:
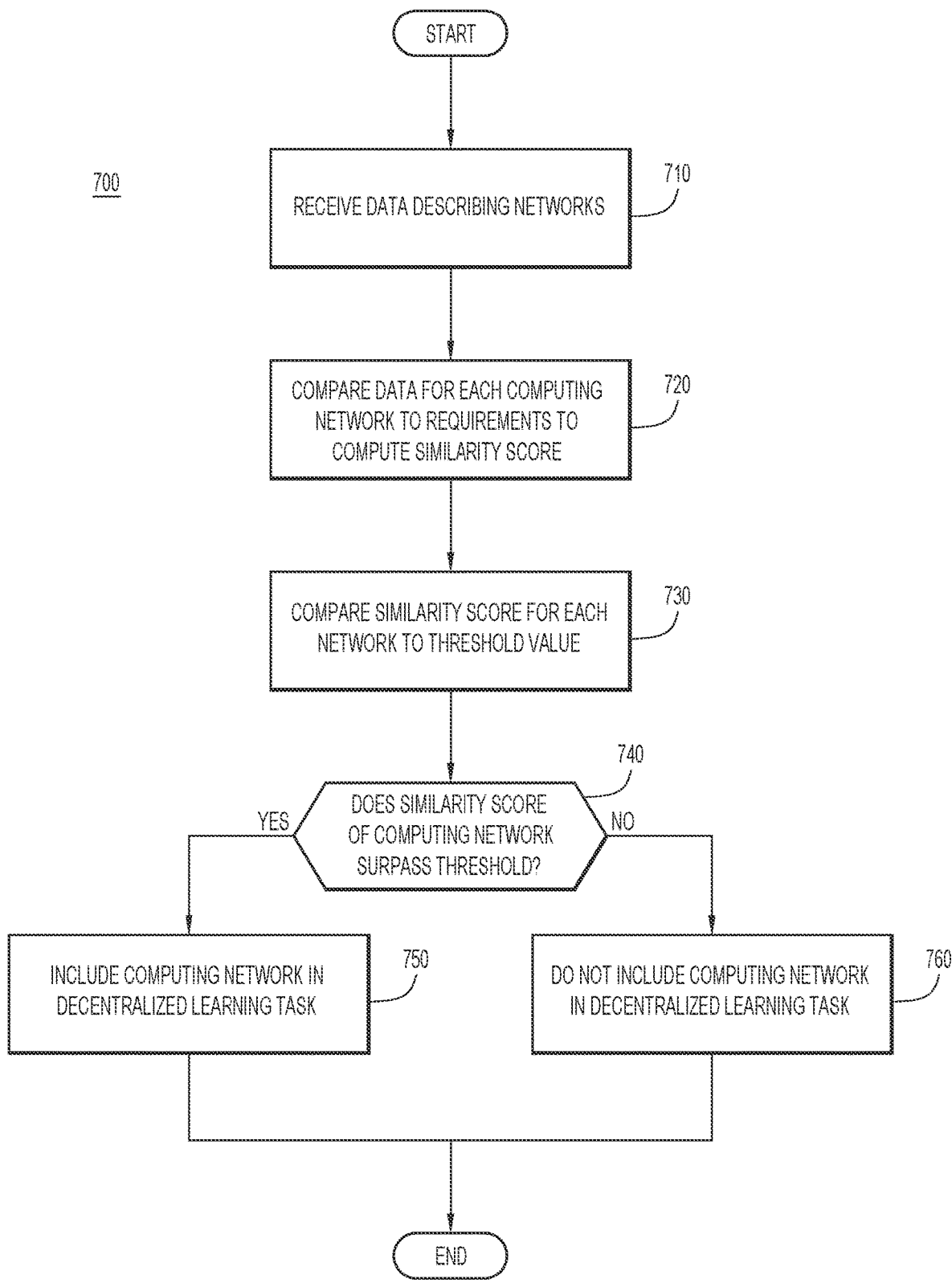
FIG. 7 is a flow chart depicting a method for selecting computing networks for training a decentralized model, in accordance with an example embodiment.

Referring to FIG. 7, a flow chart is shown illustrating a method 700 for selecting computing networks for training a decentralized model, in accordance with an example embodiment.

Data describing multiple networks is received at operation 710. The data may include a specification or other description of the components of a computing and/or communication network. In particular, the data may include a listing of features employed by each network, such as software and/or firmware that is installed (and the versions thereof), hardware components of the network, statistical data of the network, such as network performance data, and any other data, such as geographical locations of network components, event monitor data, data logs, and the like.

The data for each computing network is compared to a list of criteria to compute a similarity score for each computing network at operation 720. The similarity score can be computed as the number of criteria that are satisfied by a computing network, which is determined using the data describing the network. For example, a list of criteria may include one or more software configuration criteria, one or more software component criteria, and one or more hardware component criteria. Thus, the criteria can be satisfied when a network has a particular software component installed, has a software component in a particular configuration (e.g., has a setting or group of settings enabled/disabled), and/or has a particular hardware component installed. In some embodiments, the similarity score is represented as a percentage of the predetermined criteria that a computing network satisfies. Additionally, each criterion can be weighted to control the degree to which satisfying, or failing to satisfy, a criterion influences the resulting similarity score.

The similarity scores of each network are compared to a threshold value at operation 730. The threshold value may be a predetermined value, that is predefined along with the criteria for computing similarity scores. Operation 740 determines whether each network's similarity score surpasses the threshold value. If a given network's similarity score surpasses the threshold value, then the network is selected to be included in a decentralized learning task at operation 750; if a network's similarity score fails to satisfy the threshold value, then the network is not selected for inclusion in the decentralized learning task at operation 760. Operation 740 is repeated for all networks being considered until a subset of network having similar infrastructures is identified for the particular decentralized learning task.

Figure 8:
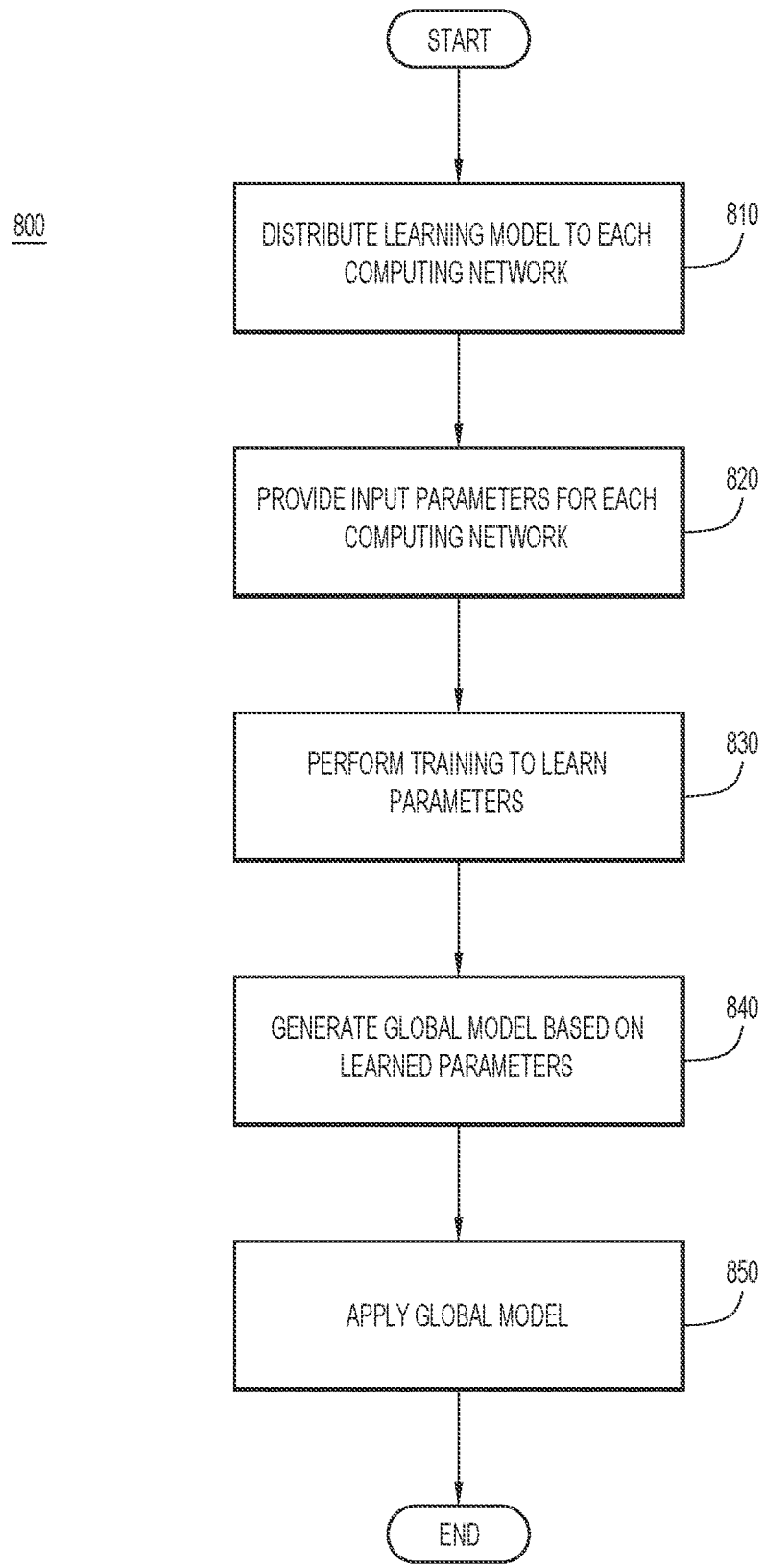
FIG. 8 is a flow chart depicting a method for training and applying a decentralized model, in accordance with an example embodiment.

Referring to FIG. 8, a flow chart is shown depicting a method 800 for training and applying a decentralized model, in accordance with an example embodiment.

A learning model is distributed to each computing network at operation 810. The learning model may include any conventional or other machine learning model that is suitable for decentralized learning tasks, such as federated learning tasks. In particular, present embodiments may utilize any learning model whose results can be combined with other learning models. In some embodiments, the learning model is a neural network model, such as a convolutional neural network, artificial neural network, recurrent neural network, and the like. The learning model may be provided to a particular computing device of each network that has been designated for training tasks, such as training server 124.

The input parameters are provided to each computing network at operation 820. The input parameters may define types or sources of training data that should be used for local training. In some embodiments, the input parameters may specify particular devices or roles of devices for inclusion in the training process. In some embodiments, homogeneous training is performed, and the same input parameters may be provided to each computing network. In other embodiments, heterogeneous training is performed, and some or all of the computing networks may be provided with different input parameters.

Local training is performed to learn parameters at operation 830. In some embodiments, the training data is unlabeled and accordingly, conventional or other unsupervised learning techniques may be employed. Local training is performed until some criterion is met, such as a number of cycles being performed, accuracy of a model failing to improve past a threshold amount from one training cycle to the next, and the like. The resulting output of each computing network's local training may then be provided to a server, such as machine learning server 102. Accordingly, each computing network's data is kept private, as the underlying data used to train the model is retained within the network and only the resulting output parameters are shared.

A global model is generated based on the learned parameters at operation 840. The global model may be generated by combining learned parameters obtained from the local training conducted at each computing network.

The resulting global model is applied at operation 850. The global model can be applied to perform network validation tasks, such as monitoring the behavior of a network after different actions, upgrades, etc. have been performed, and other anomaly detection tasks, such as identifying any unexpected occurrences, predicting network outages, and the like. Anomalies can be detected by forecasting data relating to network behavior, and then comparing the forecasted data to actual observed data of the computing network. In some embodiments, the global model predicts hardware failures. In some embodiments, the global model analyzes data packets in the data plane to identify anomalous network behavior. In some embodiments, the global model predicts future events based on telemetry data that is received from the target network to which the global model is applied. In some embodiments, the global model performs data forecasting for a computer network, and the forecasted data is compared to actual data to identify anomalous events.

Figure 9:
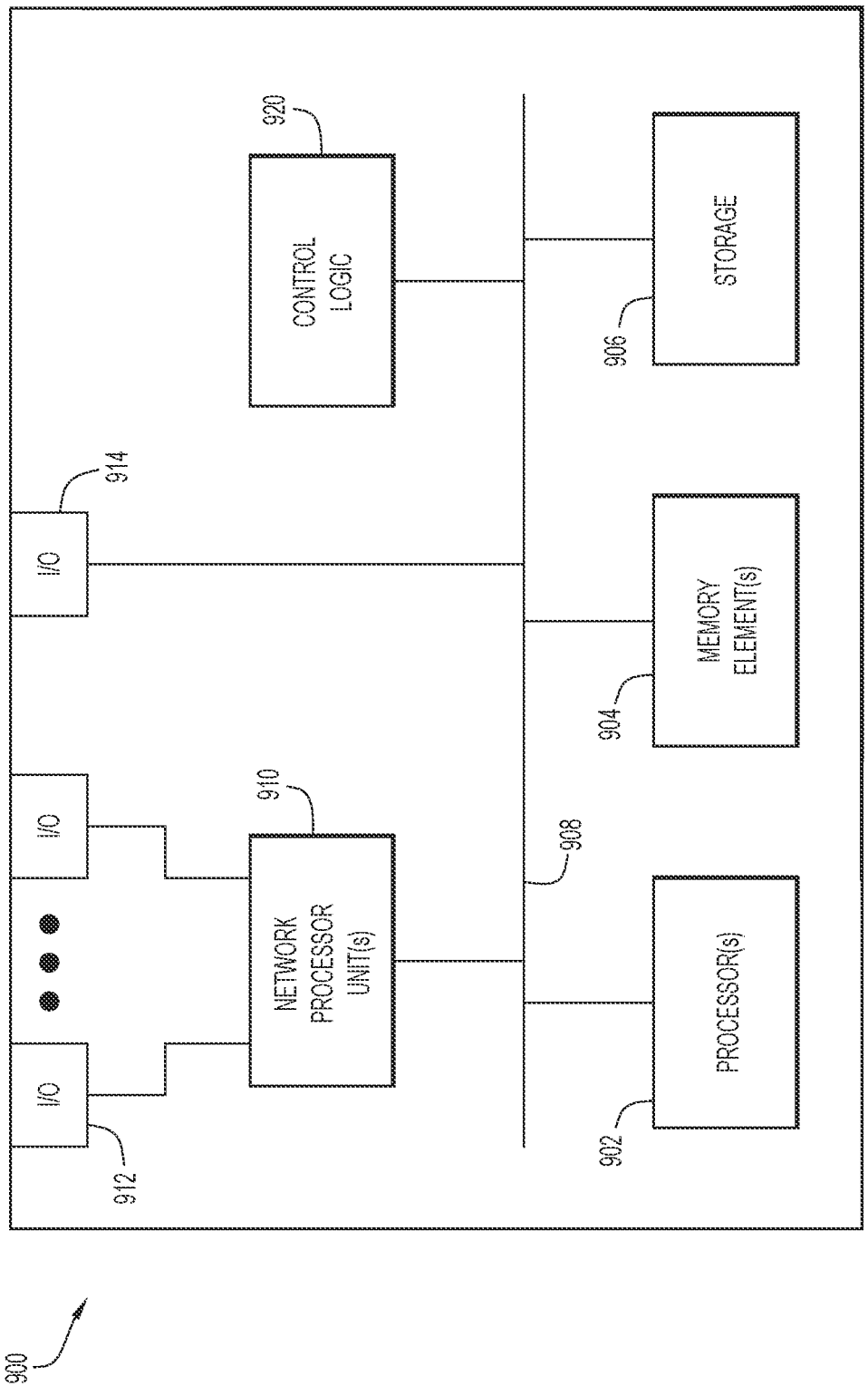
FIG. 9 is a block diagram depicting a computing device configured to train and/or apply a decentralized model, in accordance with an example embodiment.

Referring to FIG. 9, FIG. 9 illustrates a hardware block diagram of a computing device 900 that may perform functions associated with operations discussed herein in connection with the techniques depicted in FIGS. 1-8. In various embodiments, a computing device, such as computing device 900 or any combination of computing devices 900, may be configured as any entity/entities as discussed for the techniques depicted in connection with FIGS. 1-8 in order to perform operations of the various techniques discussed herein.

In at least one embodiment, the computing device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 (wired and/or wireless) to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, any other I/O port(s), and/or antenna(s)/ antenna array(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computer device 900. For example, I/O interface(s) 914 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fib®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided comprising: identifying a plurality of computing networks by determining that each computing network of the plurality of computing networks satisfies a predetermined number of criteria, providing a decentralized learning agent to each computing network, wherein the decentralized learning agent is provided with input parameters for training and is trained using training data associated with a computing network to which the decentralized learning agent is provided, obtaining a plurality of learned parameters from the plurality of computing networks, wherein each learned parameter of the plurality of learned parameters is obtained by training the decentralized learning agent provided to each respective computing network, and generating a global model based on the plurality of learned parameters.

In another form, identical input parameters are provided to each decentralized learning agent.

In another form, different input parameters are provided to at least two decentralized learning agents.

In another form, determining that each computing network satisfies the predetermined number of criteria comprises comparing a number of satisfied criteria to a predetermined threshold value, and each criterion is selected from a group of: a software configuration criterion, a hardware component criterion, and a software component criterion.

In another form, comparing the number of satisfied criteria to the predetermined threshold value comprises applying a weight value to each satisfied criterion.

In another form, the global model is applied to a target computing network to perform an anomaly detection task by comparing forecasted data generated by the global model to observed data of the target computing network.

In another form, generating the global model comprises averaging corresponding learned parameters of the plurality of learned parameters.

In one form, a computer system is provided, comprising: one or more computer processors; one or more computer readable storage media; and program instructions stored on the one or more computer readable storage media for execution by at least one of the one or more computer processors, the program instructions comprising instructions to: identify a plurality of computing networks by determining that each computing network of the plurality of computing networks satisfies a predetermined number of criteria, provide a decentralized learning agent to each computing network, wherein the decentralized learning agent is provided with input parameters for training and is trained using training data associated with a computing network to which the decentralized learning agent is provided, obtain a plurality of learned parameters from the plurality of computing networks, wherein each learned parameter of the plurality of learned parameters is obtained by training the decentralized learning agent provided to each respective computing network, and generate a global model based on the plurality of learned parameters.

In one form, one or more computer readable storage media is provided, the one or more computer readable storage media collectively having program instructions embodied therewith, the program instructions executable by a computer to cause the computer to: identify a plurality of computing networks by determining that each computing network of the plurality of computing networks satisfies a predetermined number of criteria, provide a decentralized learning agent to each computing network, wherein the decentralized learning agent is provided with input parameters for training and is trained using training data associated with a computing network to which the decentralized learning agent is provided, obtain a plurality of learned parameters from the plurality of computing networks, wherein each learned parameter of the plurality of learned parameters is obtained by training the decentralized learning agent provided to each respective computing network, and generate a global model based on the plurality of learned parameters.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    identifying a plurality of computing networks by determining that each computing network of the plurality of computing networks satisfies a predetermined number of criteria, wherein determining that each computing network satisfies the predetermined number of criteria comprises determining a similarity score for each of the plurality of computing networks, wherein the similarity score is based on a weighted count applied to each of a set of features of the plurality of computer networks, the set of features including a number of network devices per role, a communication protocol or standard employed by each computing network, and network security features, and wherein the plurality of computing networks are selected based on the similarity score for each computing network satisfying a threshold value;
    providing a decentralized learning agent to each computing network, wherein the decentralized learning agent is provided with input parameters for training and is trained using training data associated with a computing network to which the decentralized learning agent is provided;
    obtaining a plurality of learned parameters from the plurality of computing networks, wherein each learned parameter of the plurality of learned parameters is obtained by training the decentralized learning agent provided to each respective computing network; and
    generating a global model based on the plurality of learned parameters.

2. The computer-implemented method of claim 1, wherein identical input parameters are provided to each decentralized learning agent.

3. The computer-implemented method of claim 1, wherein different input parameters are provided to at least two decentralized learning agents.

4. The computer-implemented method of claim 1, wherein determining that each computing network satisfies the predetermined number of criteria comprises comparing a number of satisfied criteria to a predetermined threshold value, and wherein each criterion is selected from a group of: a software configuration criterion, a hardware component criterion, and a software component criterion.

5. The computer-implemented method of claim 1, wherein the similarity score is one selected from a group including an integer value and a percentage value evaluated using the weighted count applied to each of the set of features.

6. The computer-implemented method of claim 1, further comprising:
    applying the global model to a target computing network to perform an anomaly detection task by comparing forecasted data generated by the global model to observed data of the target computing network.

7. The computer-implemented method of claim 1, wherein generating the global model comprises averaging corresponding learned parameters of the plurality of learned parameters.

8. An apparatus comprising:
    one or more computer processors;
    a network interface configured to enable network communications;
    one or more computer readable storage media; and
    program instructions stored on the one or more computer readable storage media for execution by at least one of the one or more computer processors, the program instructions comprising instructions to:
        identify a plurality of computing networks by determining that each computing network of the plurality of computing networks satisfies a predetermined number of criteria, wherein determining that each computing network satisfies the predetermined number of criteria comprises determining a similarity score for each of the plurality of computing networks, wherein the similarity score is based on a weighted count applied to each of a set of features of the plurality of computer networks, the set of features including a number of network devices per role, a communication protocol or standard employed by each computing network, and network security features, and wherein the plurality of computing networks are selected based on the similarity score for each computing network satisfying a threshold value;
        provide a decentralized learning agent to each computing network, wherein the decentralized learning agent is provided with input parameters for training and is trained using training data associated with a computing network to which the decentralized learning agent is provided;
        obtain a plurality of learned parameters from the plurality of computing networks, wherein each learned parameter of the plurality of learned parameters is obtained by training the decentralized learning agent provided to each respective computing network; and
        generate a global model based on the plurality of learned parameters.

9. The apparatus of claim 8, wherein identical input parameters are provided to each decentralized learning agent.

10. The apparatus of claim 8, wherein different input parameters are provided to at least two decentralized learning agents.

11. The apparatus of claim 8, wherein the instructions to determine that each computing network satisfies the predetermined number of criteria comprise instructions to compare a number of satisfied criteria to a predetermined threshold value, and wherein each criterion is selected from a group of: a software configuration criterion, a hardware component criterion, and a software component criterion.

12. The apparatus of claim 8, wherein the similarity score is one selected from a group including an integer value and a percentage value evaluated using the weighted count applied to each of the set of features.

13. The apparatus of claim 8, wherein the program instructions further comprise instructions to:
apply the global model to a target computing network to perform an anomaly detection task by comparing forecasted data generated by the global model to observed data of the target computing network.

14. The apparatus of claim 8, wherein the program instructions to generate the global model comprise instructions to average corresponding learned parameters of the plurality of learned parameters.

15. One or more non-transitory computer readable storage media collectively having program instructions embodied therewith, the program instructions executable by a computer to cause the computer to:
identify a plurality of computing networks by determining that each computing network of the plurality of computing networks satisfies a predetermined number of criteria, wherein determining that each computing network satisfies the predetermined number of criteria comprises determining a similarity score for each of the plurality of computing networks, wherein the similarity score is based on a weighted count applied to each of a set of features of the plurality of computer networks, the set of features including a number of network devices per role, a communication protocol or standard employed by each computing network, and network security features, and wherein the plurality of computing networks are selected based on the similarity score for each computing network satisfying a threshold value;
provide a decentralized learning agent to each computing network, wherein the decentralized learning agent is provided with input parameters for training and is trained using training data associated with a computing network to which the decentralized learning agent is provided;
obtain a plurality of learned parameters from the plurality of computing networks, wherein each learned parameter of the plurality of learned parameters is obtained by training the decentralized learning agent provided to each respective computing network; and
generate a global model based on the plurality of learned parameters.

16. The one or more non-transitory computer readable storage media of claim 15, wherein identical input parameters are provided to each decentralized learning agent.

17. The one or more non-transitory computer readable storage media of claim 15, wherein different input parameters are provided to at least two decentralized learning agents.

18. The one or more non-transitory computer readable storage media of claim 15, wherein determining that each computing network satisfies the predetermined number of criteria comprises comparing a number of satisfied criteria to a predetermined threshold value, and wherein each criterion is selected from a group of: a software configuration criterion, a hardware component criterion, and a software component criterion.

19. The one or more non-transitory computer readable storage media of claim 15, wherein the similarity score is one selected from a group including an integer value and a percentage value evaluated using the weighted count applied to each of the set of features.

20. The one or more non-transitory computer readable storage media of claim 15, wherein the program instructions further cause the computer to:
apply the global model to a target computing network to perform an anomaly detection task by comparing forecasted data generated by the global model to observed data of the target computing network.

\* \* \* \* \*